United States Patent [19]

Salihi

[11] 3,959,705
[45] May 25, 1976

[54] DIRECT CURRENT MOTORS WITH IMPROVED COMMUTATION

[76] Inventor: Jalal Tawfiq Salihi, 20 Kahdena Road, Morristown, N.J. 07960

[22] Filed: Dec. 27, 1974

[21] Appl. No.: 536,961

[52] U.S. Cl. .............................. 318/439; 318/138; 318/254; 310/219
[51] Int. Cl.² .................................. H02K 13/00
[58] Field of Search .......... 318/138, 254, 439, 492; 310/219, 222

[56] References Cited
UNITED STATES PATENTS

| | | | |
|---|---|---|---|
| 3,025,443 | 3/1962 | Wilkinson et al. | 318/254 X |
| 3,530,347 | 9/1970 | Newell | 318/138 |
| 3,600,658 | 8/1971 | Kuniyoshi | 318/439 |
| 3,662,237 | 5/1972 | Favre | 318/254 |

*Primary Examiner*—B. Dobeck

[57] ABSTRACT

This invention relates to improved direct current motor schemes where mechanical commutators are used in conjunction with diodes and controlled rectifiers to overcome commutation or to provide a smoothly controllable motor torque. The schemes are applicable to series, separately excited and permanent magnet types dc motors.

15 Claims, 11 Drawing Figures

DIRECT CURRENT MOTORS WITH IMPROVED COMMUTATION

One of the limiting factors of conventional direct current machines is the inability to transfer the necessary armature current through the brush contact at the commutator without sparking. Sparking causes destructive blackening, pitting, and wear of both commutator and brushes. These conditions progressively become worse and lead to burning away of the copper and carbon. Also the commutation problem becomes more severe as the speed of the motor increases and when the torque (current) at a given speed increases. Consequently, this phenomenon limits the speed and the horsepower that can be obtained safely from a given machine size.

Several direct current motor schemes using a combination of commutater, slip rings and diodes to reduce commutation have been described in a previous patent application (Ser. No. 406,677, by Salihi) now U.S. Pat. No. 3,906,321. The present patent application is an improvement over the previous patent application. This improvement includes the use of diodes for blocking the flow of circulation current during commutation and the use of controlled rectifiers for providing a smoothly variable motor torque. In addition the controlled rectifiers block the flow of circulating current during commutation. Smooth torque control is achieved, when operating from a fixed dc voltage source, by gating the controlled rectifiers. The controlled rectifiers turn-off automatically without the need for forced commutation.

Accordingly, it is the object of the present invention to provide commutator DC motor systems operating from a DC voltage source where in addition to conventional motor components, that is, the field, armature, commutator and associated brushes, a combination of diodes controlled rectifiers and slip rings are used to provide a ready path for the flow of reactive energy so as to limit the maximum value of the induced voltage in the motor windings during sudden changes in current and to block circulating current between commutator segments. Another object of this invention is to provide a commutator DC motor system using diode and controlled rectifier to provide a smoothly variable motor torque.

A further object of this invention is to make use of the flexibility in motor design realized by the combination of commutator, diodes and controlled rectifier to design motors with less number of windings and commutator segments and with simpler winding configurations, compared to conventional commutator motors.

Still another object of this invention is to make further use of the flexibility offered to expand the operating range of the motor to incorporate a wider range of current, torque, voltage, speed and consequently a higher horsepower per unit weight.

Additional objects and advantages of the present invention will be apparent from the following description wherein the figures listed below are incorporated as illustrating a preferred embodiment.

Figure 1:
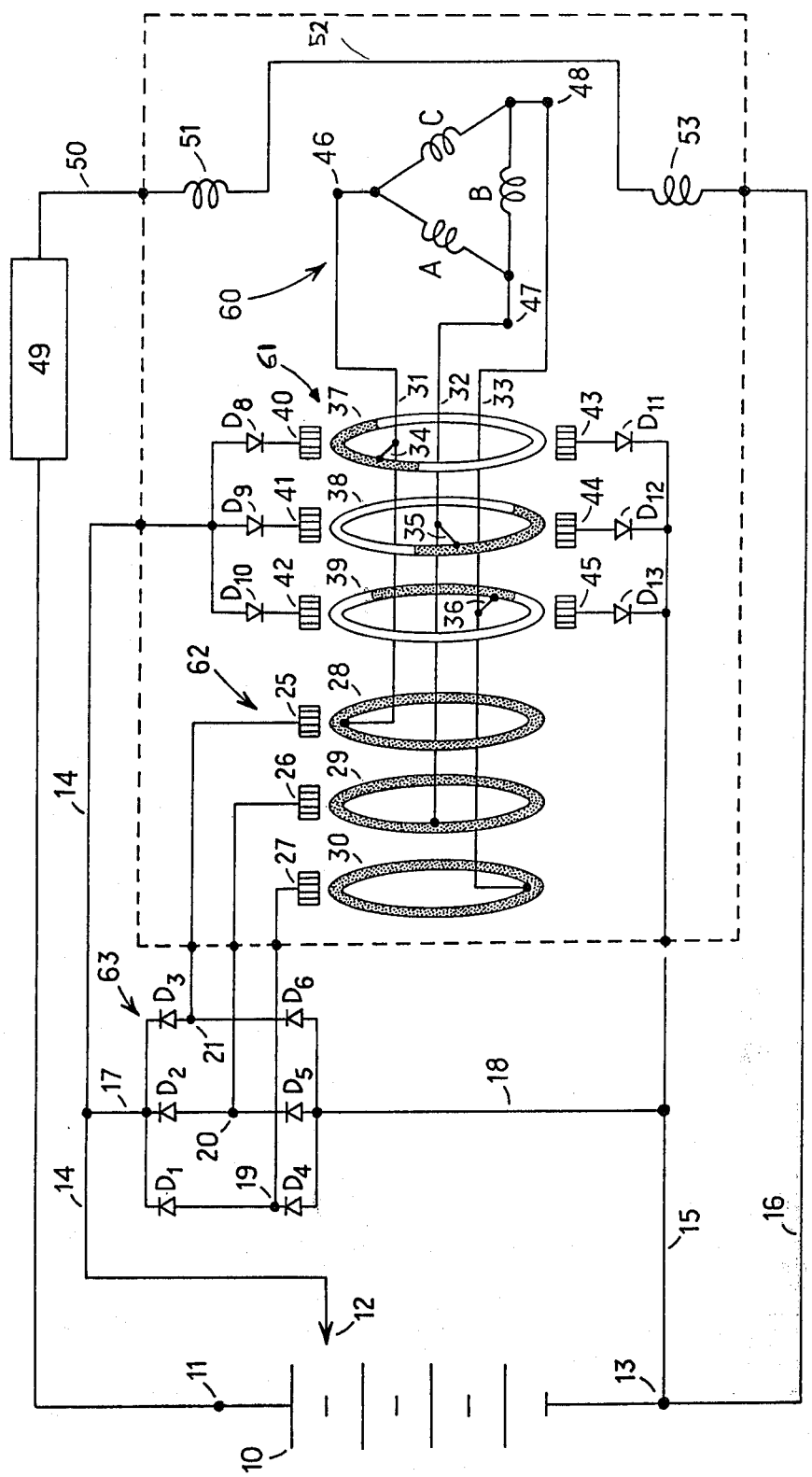
FIG. 1 is a schematic diagram illustrating one version of this invention used in a separately excited direct current motor system to overcome commutation.

References to be made to the drawings and more particularly to FIG. 1, which shows the schematic diagram of a two pole separately excited direct current motor system of this invention. More specifically the motor system consists essentially of stationary field windings 51, 53, rotating armature windings 60, rotating commutator 61 and associated stationary brushes, six blocking diodes $D_8$–$D_{13}$, three rotating slip rings 62 and associated stationary brushes, and a full wave bridge rectifier 63.

The armature winding 60, consists of three windings A, B, C connected in delta. The commutator consists of three rotating rings 37, 38 39 and two sets of diametrically opposite brushes designated by 40, 41, 42 in the first set and 43, 44, 45 in the second set. The commutator rings are identical in design, each having an electrically conductive segment of preferably 120° shown shaded with the rest of the surface being non-conductive. As shown in FIG. 1, the conductive segment of the three commutator rings are displaced by 120° with respect to the conductive segments of the other two commutator rings leading one by 120° and lagging the other by 120°.

The three terminals of the armature windings designated by the reference numerals 46, 47, 48, are connected to the conducting segments of the corresponding commutator rings 37, 38, 39, by conductors 31, 34–32, 35–33, 36 respectively.

The DC voltage source feeds the armature winding through a voltage controller, (represented for the purpose of simplification by the movable tap 12), conductor 14, blocking diodes $D_8$, $D_9$, $D_{10}$, brushes 40, 41, 42, conducting segments of the commutator rings 37, 38, 39, armature winding, conducting segments of commutator rings 37, 38, 39, brushes 43, 44, 45, blocking diodes $D_{11}$, $D_{12}$, $D_{13}$, conductor 15, negative terminal of the Dc voltage source designated by the reference numeral 13.

The DC voltage source feeds the field windings through the positive terminal of the DC power source designated by the reference numeral 11, the field controller 49, conductor 50, field winding 51, conductor 52, field winding 53, conductor 16, and the negative terminal of the DC voltage source designated by the reference numeral 13.

The auxiliary path for reactive and regenerative energy is provided essentially by the slip rings and the full wave bridge rectifier. The three slip rings and associated three brushes are designated by the reference numerals 28, 29, 30, and 25, 26, 27, respectively. Each brush is in electrical contact with the associated slip ring over the entire surface of the ring. The slip rings 28, 29, 30, are connected to terminals 46, 47, 48, of the armature winding by conductors 31, 32, 33, respectively.

The bridge rectifier consists of six diodes $D_1$, $D_2$, $D_3$, $D_4$, $D_5$, $D_6$. The junction point of diodes $D_1$, $D_2$, $D_3$ is connected through conductor 17 and 14 to the movable tap 12 of the DC voltage source. The junction point of diodes $D_4$, $D_5$, $D_6$ is connected through conductors 18 and 15 to the negative terminal 13 of the DC voltage source. The junction points of diodes $D_3D_6$, $D_2D_5$ and $D_1D_4$ are connected to the slip ring brushes 25, 26, 27, respectively.

The six diodes $D_8$, $D_9$, $D_{10}$, $D_{11}$, $D_{12}$, $D_{13}$, block the flow of circulating current between commutators 37, 38, 39. However they allow a ready path for current flow from the voltage source 10 to each commutator. The bridge rectifier limits the induced voltage across the motor winding.

Figure 2:
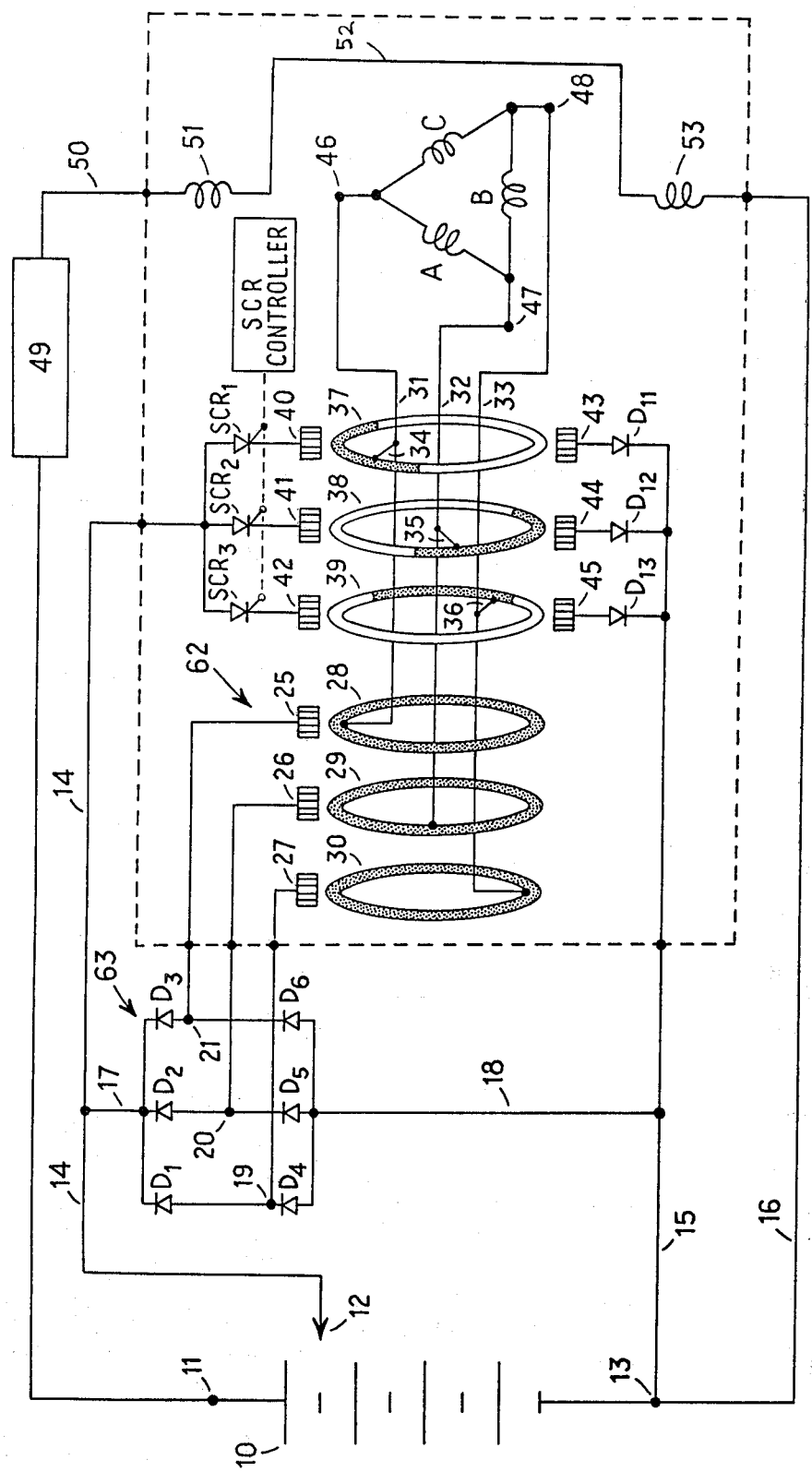
FIG. 2 is a schematic diagram illustrating another version of invention used in a separately excited direct current motor system to overcome commutation and provide smooth power and torque control.

FIG. 2, is another version of this invention which is identical to FIG. 1, except for replacing the three blocking diodes $D_8$, $D_9$, $D_{10}$ by three controlled rectifiers $SCR_1$, $SCR_2$, $SCR_3$, respectively. The controlled rectifiers, as in the case of diodes, block the flow of circulating current between commutators. They also provide an additional function of controlling the power flow to the armature and thus controlling motor torque. This can be achieved by trigger signals applied to the control rectifiers provided by a controller. There are numerous trigger schemes that can be used for gating the controlled rectifiers. More specifically, triggering schemes similar to those used for three phase controlled rectifiers and known to those skilled in the arts can be used with some modifications. For example, the trigger sequence for this invention can be synchronized to the angular position of the motor shaft in a manner similar to synchronizing the triggering of three phase controlled rectifier to the frequency and phase sequence of the 60 c/s three phase supply voltage. Natural commutation can be sufficient to turn-off the controlled rectifiers of this invention. However, it is desirable to provide a negative bias to insure the fast recovery of the controlled rectifier.

Figure 3:
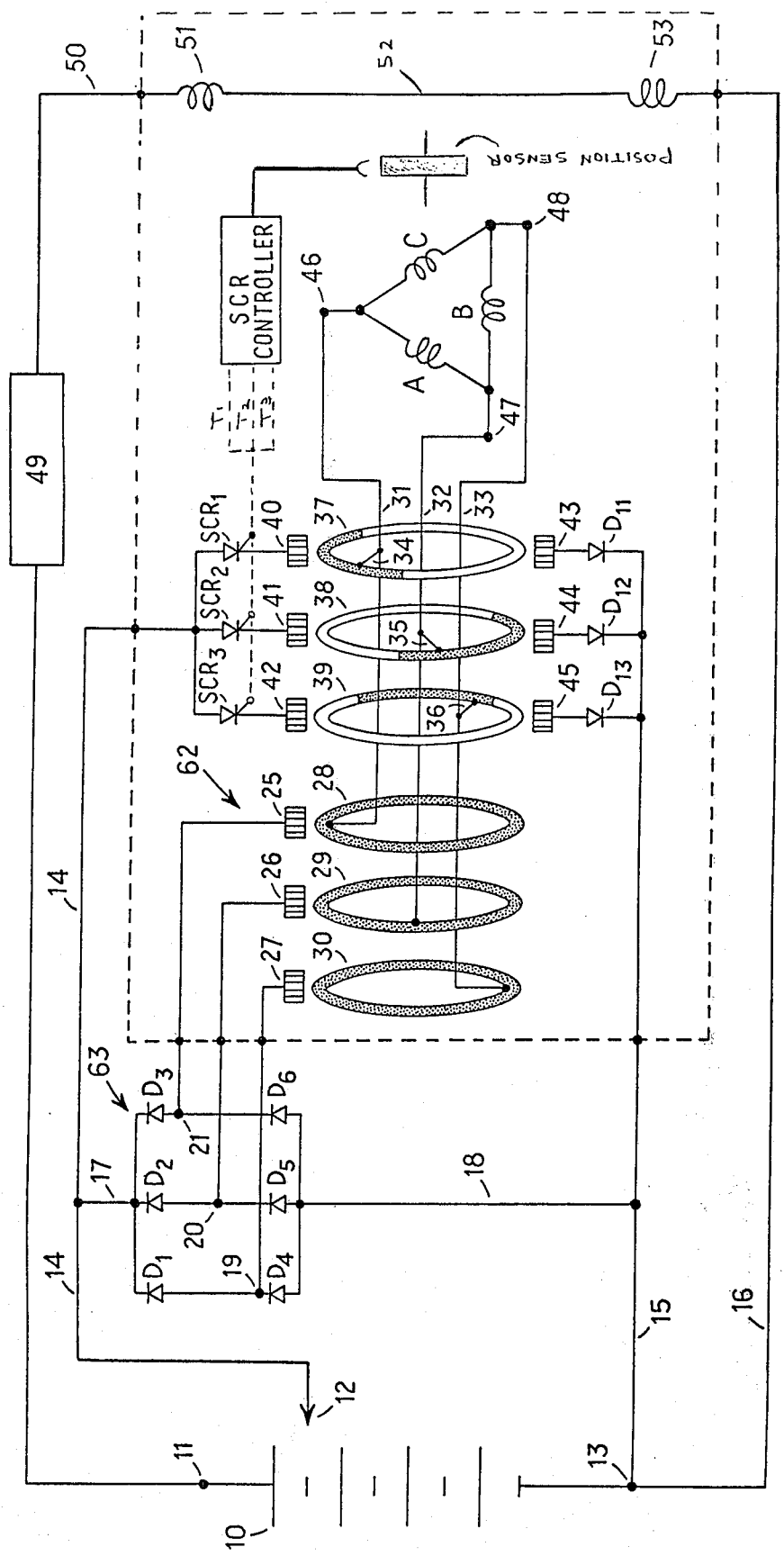
FIG. 3 is a schematic diagram illustrating more details of power control scheme used in the motor system of FIG. 2.

FIG. 3, shows the motor scheme of FIG. 2 incorporating and SCR controller designated by the reference numeral 64, which provides the necessary triggers to the SCRs. The controller is activated by the output of the motor shaft position sensor designated by the reference numeral 65. The controller provides three trigger signals $T_1$, $T_2$, $T_3$ to $SCR_1$, $SCR_2$, $SCR_3$, respectively. The three trigger signals are in synchronism with the relative position of motor shaft and are displaced 120 electrical degrees with respect to each other. The conduction angle of each trigger signal is variable from zero to preferably 120°. A DC control signal $V_c$ variable from zero to a maximum pre-set value, is applied to the controller and varies the conduction angle of all trigger signals simultaneously from zero to maximum value. Thus by varying the control voltage from zero to the maximum value, the power flow to the motor and consequently the motor torque can be varied smoothly from zero to maximum value. FIG. 3, also shows an example of negative bias which can be used to assure the fast recovery of the SCRs during the non-conduction intervals. The negative bias is supplied by a DC voltage source V of high internal resistance R. Negative bias is applied to the cathodes of the controlled rectifiers $SCR_1$, $SCR_2$, $SCR_3$ through high resistances $R_1$, $R_2$, $R_3$ respectively. The high values of resistances used makes the dissipations in bias circuitry negligible. The bias scheme in FIG. 3, is shown as an example. Other biasing schemes can be used. For example the bias source can be supplied by the rectified output of the secondary winding of a Royer Oscillator supplied from the main voltage source 10.

Figure 4:
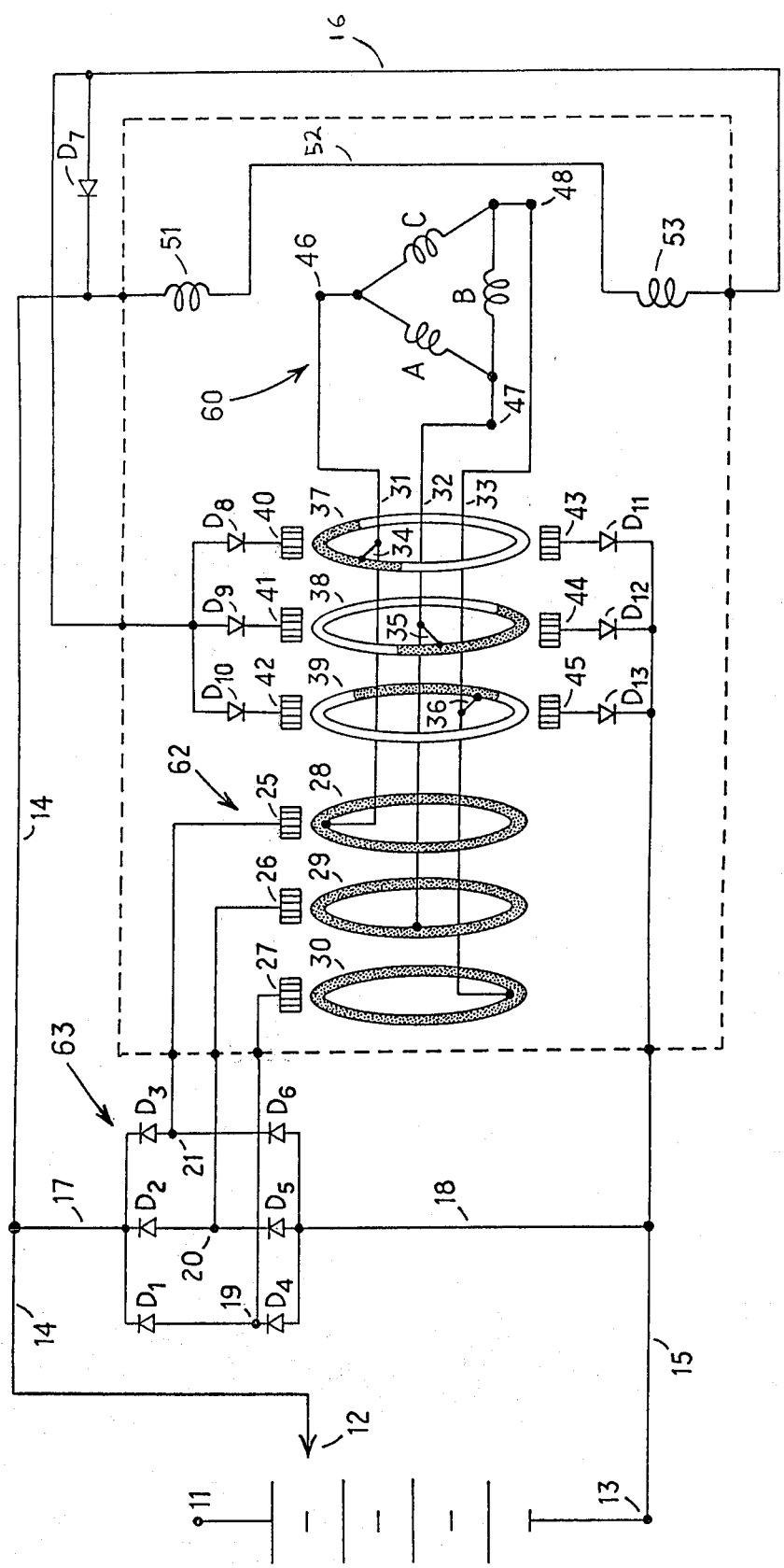
FIG. 4 is a schematic diagram illustrating a version of this invention used in a series connected direct current motor system to overcome commutation.

FIG. 4, is a schematic diagram illustrating a version of this invention where a combination of commutator, slip rings and diodes are incorporated in a two pole series direct current motor. In this motor system the armature and field are connected in series and are fed from the DC voltage source through a voltage controller (represented for the purpose of simplification by the movable tap 12), conductor 14, field winding 51, conductor 52, field winding 53, conductor 16, diodes $D_8$, $D_9$, $D_{10}$, commutator brushes 40, 41, 42, conducting segments of commutator rings 37, 38, 39, armature winding, conducting segment of commutator segments 37, 38, 39, commutator brushes 43, 44, 45, diodes $D_{11}$, $D_{12}$, $D_{13}$, conductor 15, and negative terminal of the DC voltage source designated by the reference numeral 13. Also a freewheeling diode $D_7$ is connected across the field to provide a path for the field current during interruptions of the field by the commutator. Except for these differences, the motor system of FIG. 4 and FIG. 1 are similar, where same reference numerals are used to designate similar components.

Figure 5:
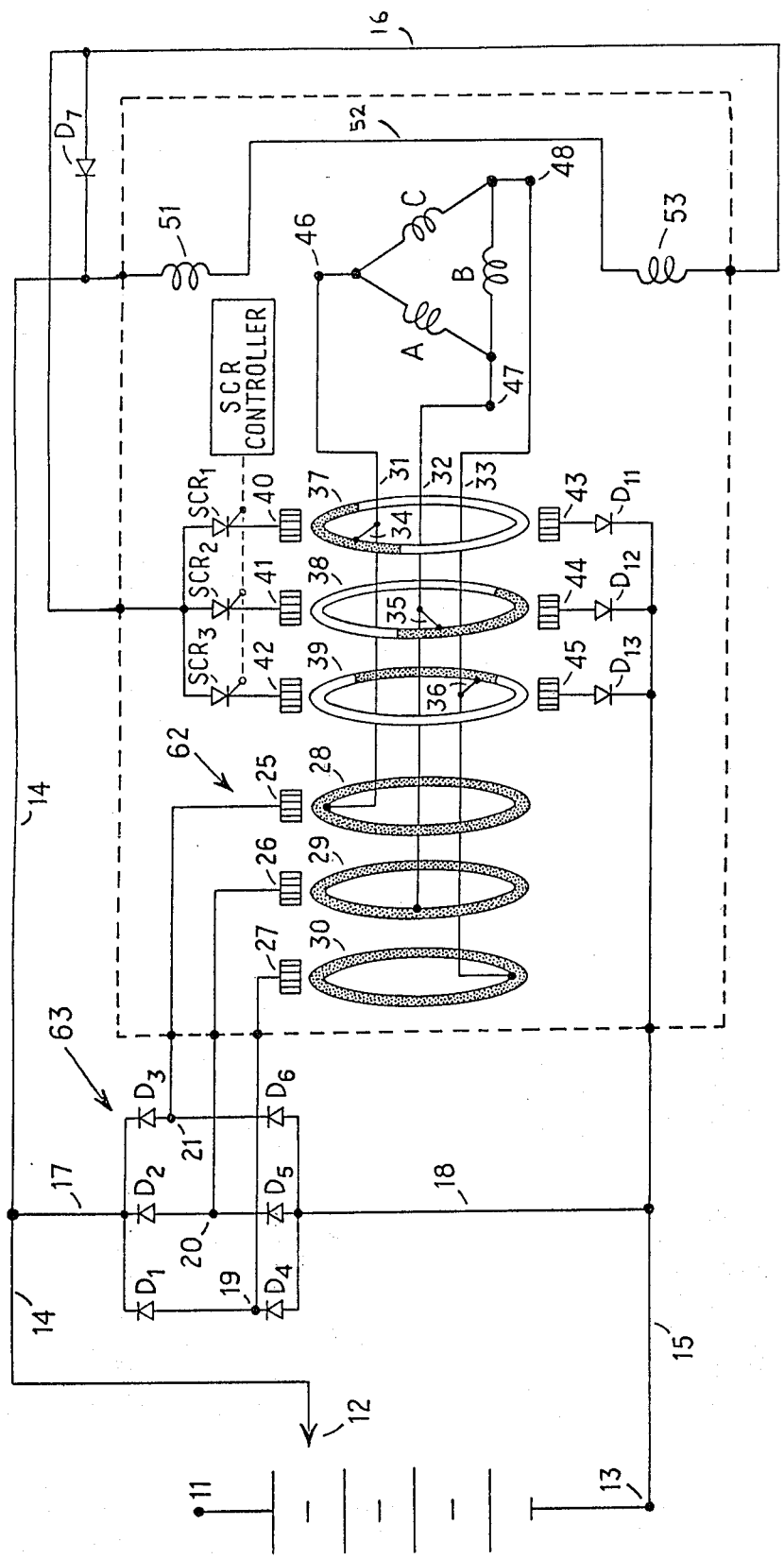
FIG. 5 is a schematic diagram illustrating another version of this invention used in a series connected direct current motor system to overcome commutation and provide smooth power and torque control.

FIG. 5, is another version of this invention which is identical to FIG. 4, except for replacing the three diodes $D_8$, $D_9$, $D_{10}$ by three controlled rectifiers $SCR_1$, $SCR_2$, $SCR_3$, respectively, and the associated controller. The controlled rectifier, as in the scheme of FIG. 2, provides the additional function of smoothly controlling the power flow to the armature, and thus the motor torque.

Figure 6:
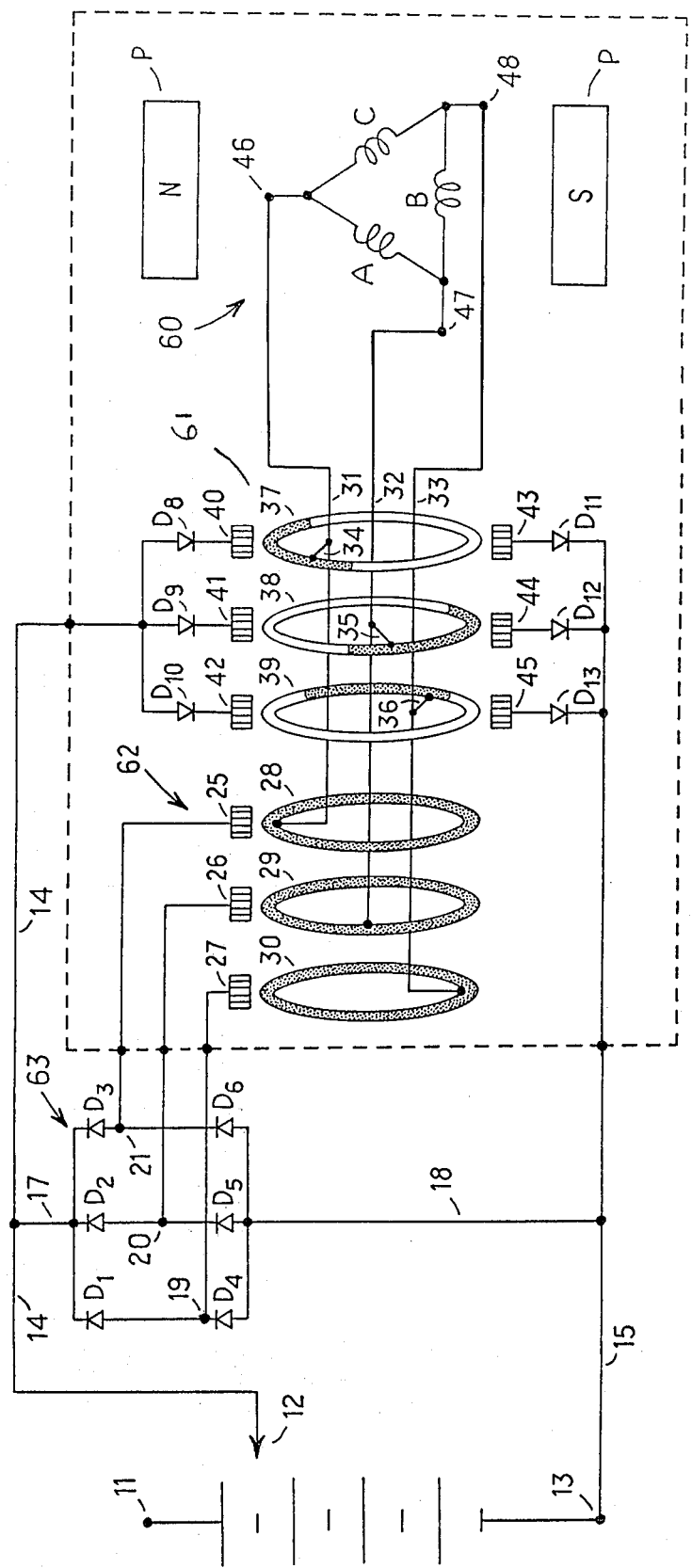
FIG. 6 is a schematic diagram illustrating a version of this invention used in a permanent magnet direct current motor system to overcome commutation.

FIG. 6, is a schematic diagram illustrating a version of this invention, where a combination of commutator, slip rings and diodes are incorporated in a two pole permanent magnet direct current motor. Except for the replacement of the field windings by permanent magnets P, the motor system of FIG. 6, is identical to the motor system of FIG. 1, where same reference numerals are used to designate identical components. Also, the function of commutator, slip ring and diode combination are identical in the two motor systems.

Figure 7:
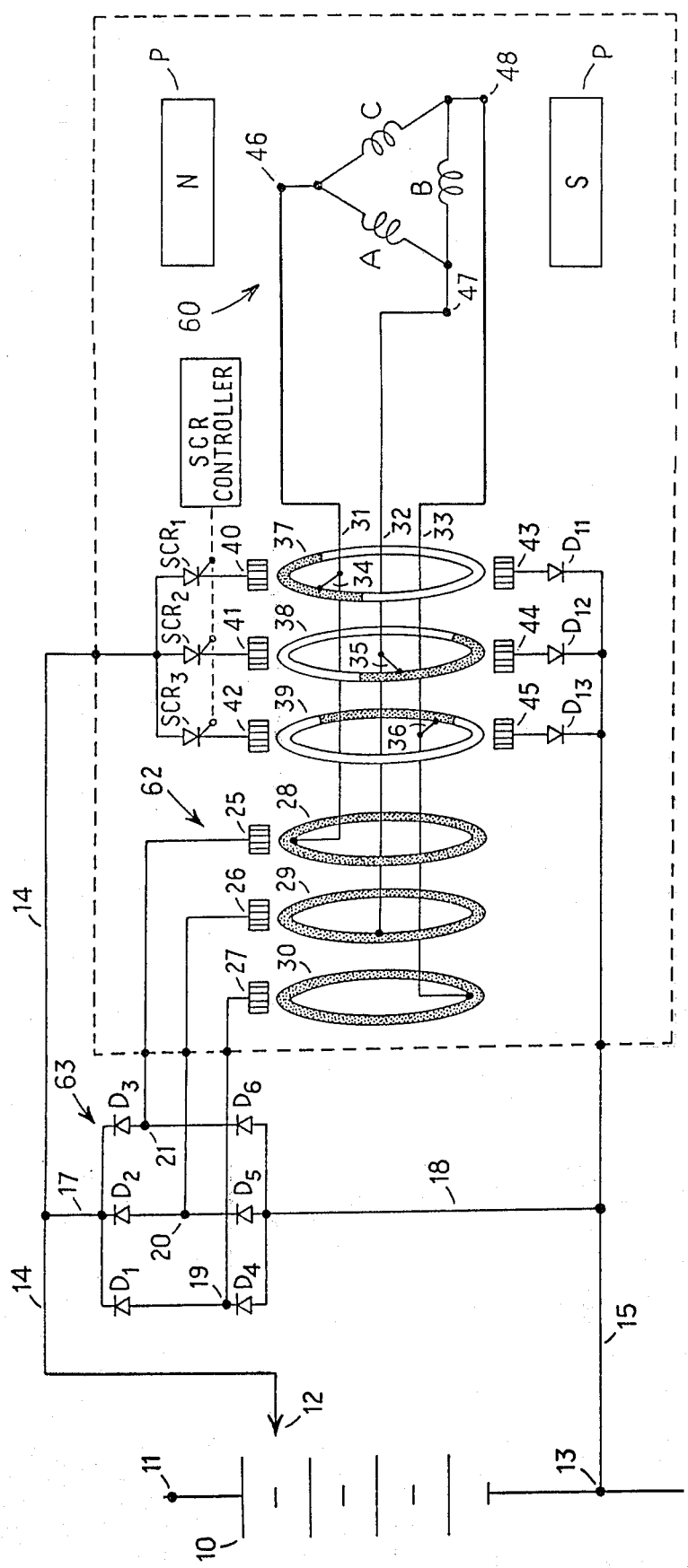
FIG. 7 is a schematic diagram illustrating another version of this invention used in a permanent magnet direct current motor system to overcome commutation and provide smooth torque and power control.

FIG. 7, is another version of this invention which is identical to FIG. 6, except for replacing the three diodes $D_8$, $D_9$, $D_{10}$ by three controlled rectifiers $SCR_1$, $SCR_2$, $SCR_3$, respectively, and the associated controller. The controlled rectifiers as in the scheme of FIG. 2, provides the additional function of smoothly controlling the power flow to the armature and thus the motor torque.

Figure 8:
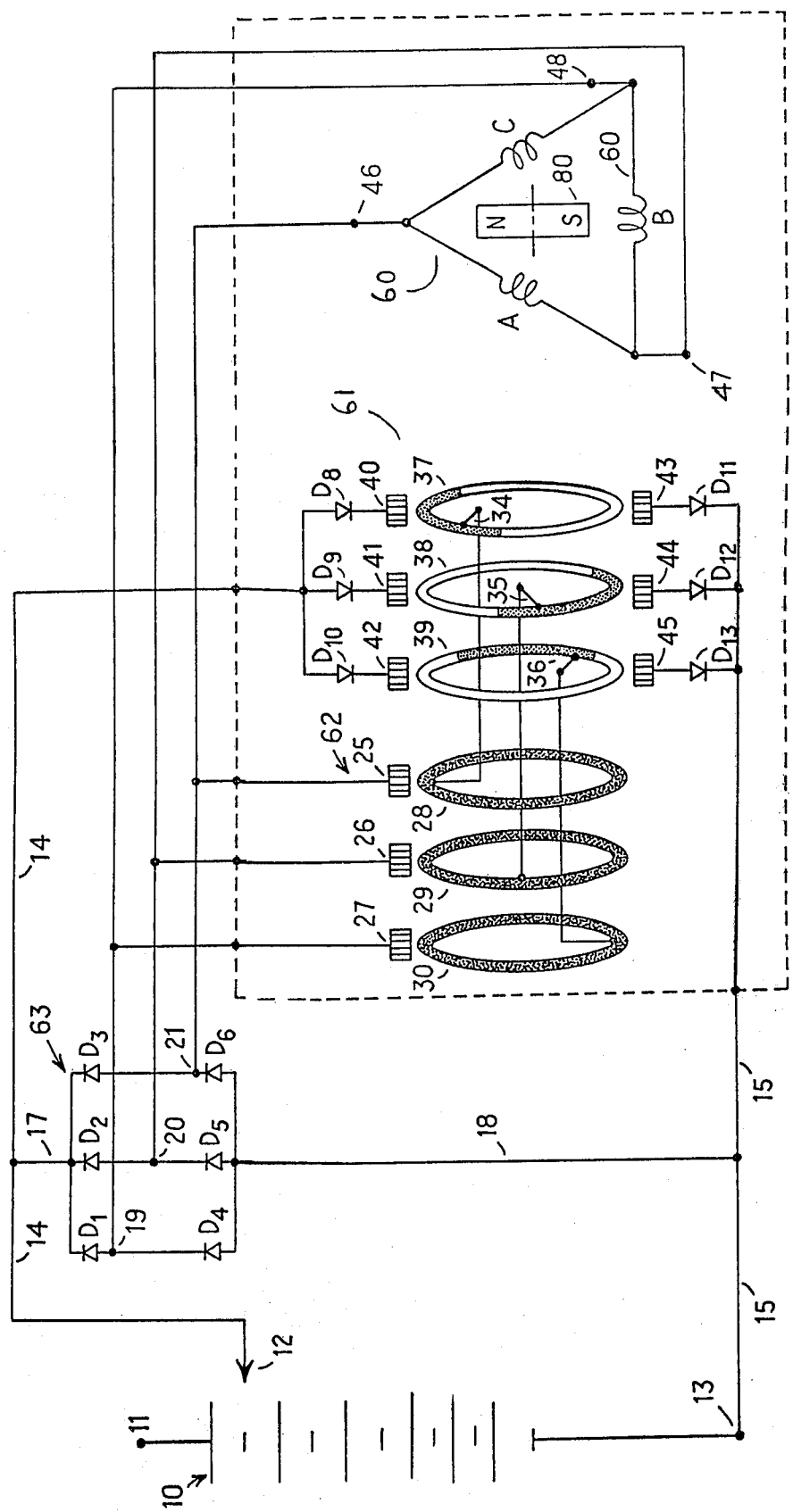
FIG. 8 is a schematic diagram illustrating another version of this invention similar to the permanent magnet direct current motor system of FIG. 6, except for using a rotating permanent magnet field and a stationary armature winding compared to a stationary permanent magnet field and rotating armature winding used in FIG. 6.

FIG. 8, is a schematic diagram illustrating a modification of the permanent magnet direct current motor system of FIG. 6, described above. In this modified version a rotating permanent field magnet and a stationary armature winding is used compared with a stationary permanent field magnet and a rotating armature winding used in the motor system of FIG. 6. The rotating permanent magnet with a north and south pole is designated by the reference numeral 80 and the stationary armature winding is designated by the reference numeral 60. The armature winding, as in the previous case consists of three windings, A, B, C connected in delta. The end terminals of the armature winding designated by the reference numerals 46, 47, 48 are electrically connected to slip ring brushes 25, 26, 27 instead of the slip rings 28, 29, 30 in the previous system. Except for these changes, the two motor systems of FIG. 8 and FIG. 6 are similar where identical numerals and letters designate identical components. Also, the electrical circuit of the two motor systems are equivalent and therefore the principle of operation of the two motor systems are similar.

Figure 9:
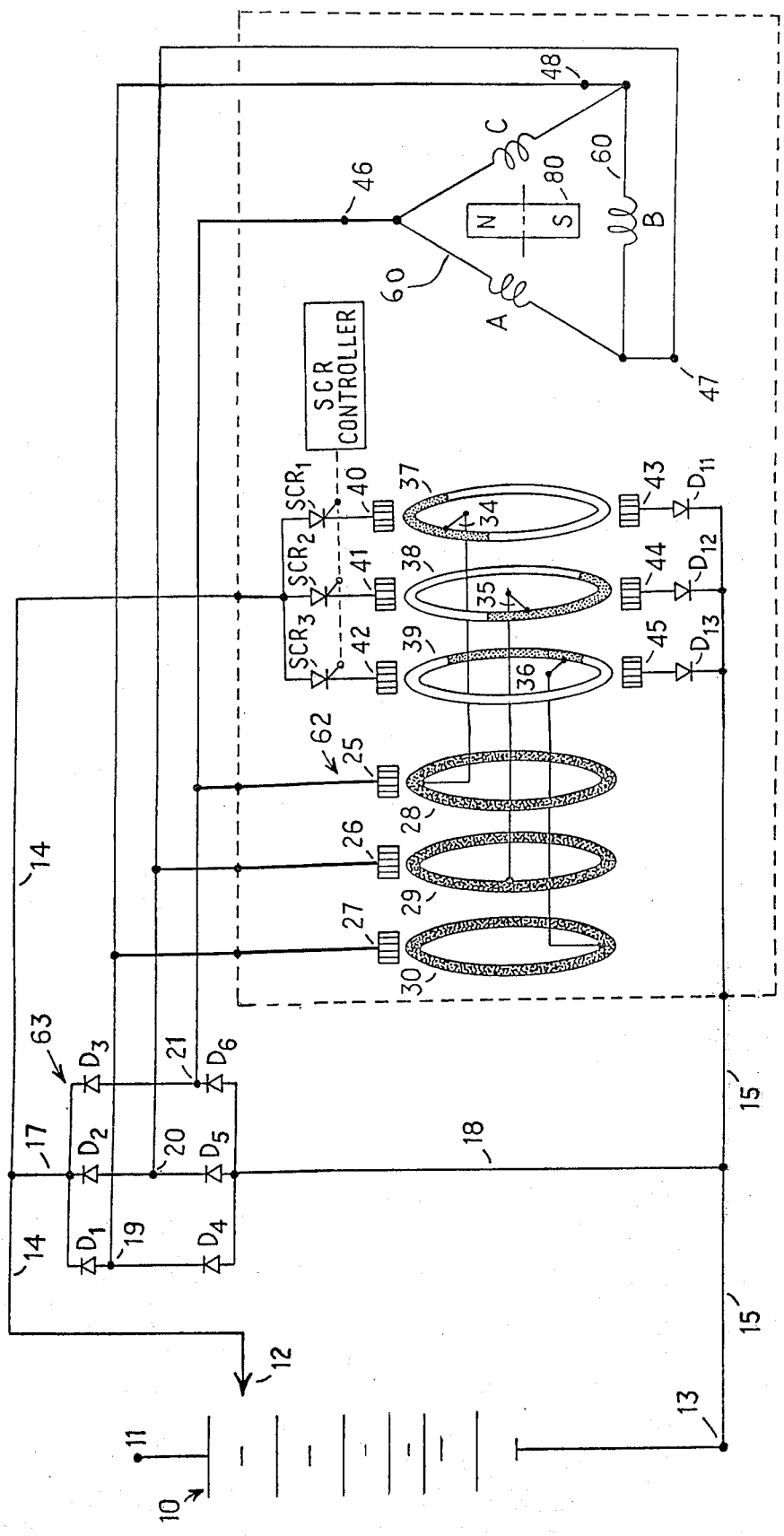
FIG. 9 is a schematic diagram illustrating another version of this invention similar to the permanent magnet direct current motor system of FIG. 7, except for using a rotating permanent magnet field and a stationary armature winding compared to a stationary permanent magnet field and rotating armature winding used in FIG. 7.

FIG. 9, is another version of this invention which is identical to FIG. 8, except for replacing the three diodes $D_8$, $D_9$, $D_{10}$ by three controlled rectifiers $SCR_1$, $SCR_2$, $SCR_3$, respectively, and the associated controller. The controlled rectifier, as in the scheme of FIG. 2, provides the additional function of smoothly controlling the power flow to the armature and consequently the motor torque.

Figure 10B:
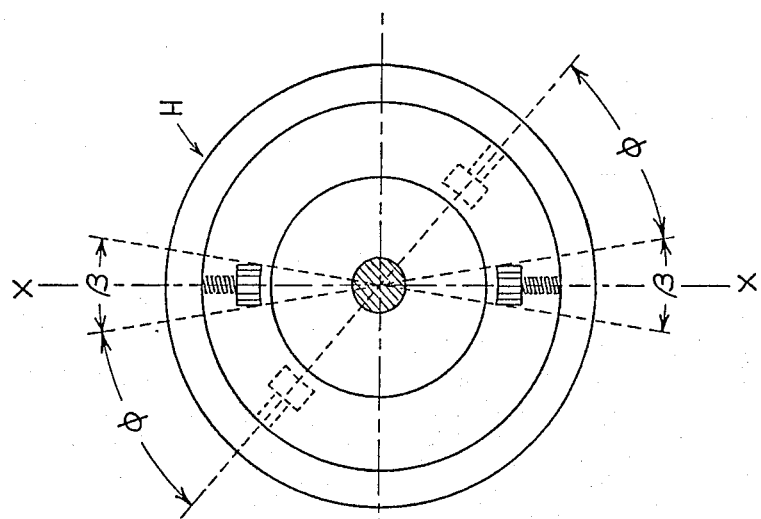
FIG. 10 is a simplified schematic diagram which illustrates some possible variations in commutator and brush arrangements used in the motor systems of FIGS. 1 through 9.
Figure 10A:
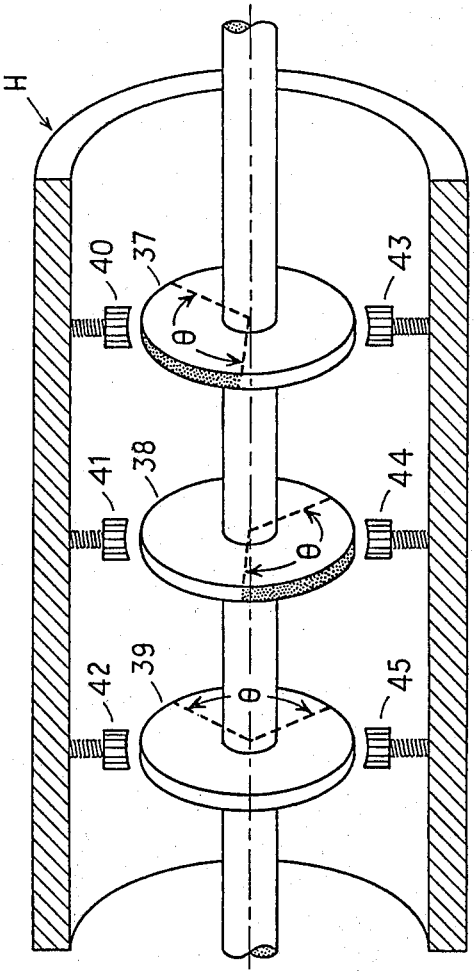

FIG. 10, shows more details of the commutator used in the motor system of FIGS. 1 through 9. FIG. 10a depicts a simplified three dimensional view of the commutator and FIG. 10b depicts a side view of the commutator. As mentioned above, the commutator consists of three rotating rings 37, 38, 39 mounted on the motor shaft and two sets of stationary brushes, each set comprising of three brushes designated by the reference numerals 40, 41, 42 and 43, 44, 45, respectively.

The three commutator rings are identical in design, each having a conductive segment of 120° angular width shown shaded and the rest of the surface being non-conductive. The three conductive segments of commutator are displaced by 120° exactly with respect to the other two segments leading one by 120° and lagging the other by 120°.

All brushes are mechanically mounted and supported by a brush holder assembly designated by the letter H such that the two sets of three brushes are pressed on diametrically opposite sides of the commutator rings as shown in FIG. 10. The brush holder assembly includes appropriate isolation for the individual brushes, and includes appropriate mechanism to shift the total brush system by any desired angle ($\phi$) to either side of the designed operating axis (XX) shown in FIG. 10. That is, a lead or lagging brush position relative to the designed axis can be obtained to optimize the motor performance.

Although an angular width of 120° was specified for the conductive segments of the commutator rings of the motor system of FIGS. 1-9, other angular widths slightly different than 120° can be used to improve motor operation.

It is noted that the simplified schematic representation of the commutator and associated brush holder assembly of FIG. 10, is intended only for the purpose of illustrating the principle of operation and should not be interpreted in any way to indicate a preferred design or actual location of components. Several types of brush holder configurations known to those skilled in the art can be used.

Though the principal of this invention has been discussed in nine configurations of FIGS. 1-9, this in no way is meant to restrict the application of the principle to other configurations of direct current motor systems. For example, in each of the three motor systems described, a star connected armature winding can be used instead of the specified delta connected winding. Also, each of the motor systems can operate as a generator where the auxiliary path for reactive energy overcome commutation problems in a manner similar to motor operation.

It should be noted that this patent description does not cover all secondary components obvious to those skilled in the art and necessary for normal working of the motor systems. These include for example, suppressors for protecting the diodes and controlled rectifiers, inductances to limit fast rise in currents, and other secondary components.

While the embodiments of the present invention as herein disclosed constitutes preferred forms, it is to be understood that other forms might be adopted.

What is claimed is as follows:

1. A separately excited two pole direct current motor system comprising, stationary field windings with first and second terminals, rotating armature, armature windings, commutators and associated stationary brushes, slip rings and associated stationary brushes, a full wave bridge rectifier, first and second set of diodes each set comprising of first, second and third diodes, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first, second and third brushes, each said brush resting against a corresponding one of said first, second and third commutator rings, said first and second sets of commutator brushes being on diametrically opposite sides of the said commutators, first second and third brushes of said first set of commutating brushes connected electrically to anodes of first second and third diodes respectively of said first set of diodes, the cathodes of all diodes of said first set of diodes connected electrically to the positive terminal of a dc voltage source, first second and third brushes of said second set of commutator brushes connected electrically to cathodes of first second and third diodes respectively of said second set of diodes, the anodes of all diodes of said second set of diodes connected electrically to the negative terminal of said dc voltage source, said slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with a conducting segment of one of the corresponding said commutator rings, also said first and second and third end terminals of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one of the said three slip ring brushes, the cathode ends of all said three pairs of first and second diodes connected together by a first conductor, the anode ends of all said three pairs of first and second diodes connected together by a second conductor, said first conductor connected to the positive terminal of said dc voltage source, said second conductor connected to the negative terminal of said dc voltage source, said stationary field winding energized separately from said dc voltage source through a field controller.

2. A separately excited two pole direct current motor system comprising, stationary field windings with first and second terminals, rotating armature, armature windings, commutators and associated stationary brushes, slip rings and associated stationary brushes, a full wave bridge rectifier, first second and third controlled rectifiers and associated trigger and bias circuits, first second and third diodes, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being nonconductive, each said conductive segment of said three commutator rings being displaced symmetrically by 120° with respect to the other two segments leading one and lagging the other, each said first and second set of commutator brushes comprising first second and third brushes each resting against one of said first second and third commutator rings, said first and second sets of commutator brushes being on diametrically opposite sides of the commutators, first second and third brushes of said first set of commutating brushes connected electrically to anodes of said first second and third controlled rectifiers, the cathodes of all said three controlled rectifiers connected electrically to the positive terminals of a dc voltage source, first second and third brushes of said second set of commutator brushes connected electrically to cathodes of said first second and third diodes respectively, the anodes of all said three diodes connected electrically to the negative terminal of said dc voltage source, said slip rings comprising first second and third electrically conductive rings and associated first second and third stationary slip ring brushes resting against the corresponding rings, said first second and third end terminals of said armature winding connected respectively to said first second and third commutator segments such that each said winding terminal is electrically conductive with conducting segment of one of corresponding said commutator rings, also said first second and third end terminal of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one said three slip ring brushes, the cathode ends of all said three pairs of first and second diodes connected together by a first conductor, the anode ends of all said three pairs of first and second diode connected together by a second conductor, said first conductor connected to the positive terminal of said dc voltage source, said second conductor connected to the negative terminal of said dc voltage source, said stationary field winding energized separately from said dc voltage source through a field controller, said trigger circuit providing three gating signals to said first second and third controlled rectifier thus providing means for smoothly controlling armature power, said bias circuit comprising of first second and third resistances connected to the cathodes of first second and third controlled rectifiers respectively, the other end of all said three resistances connected to the positive terminal of a bias source, the negative terminal of said bias source connected to the positive terminal of said voltage source.

3. A direct current series two pole motor system comprising, field windings with first and second terminals, field diode, rotating armature, armature windings, commutators and associated stationary brushes, slip rings and associated stationary brushes, a full wave bridge rectifier, first and second set of diodes each set comprising first second and third diodes, said armature windings comprising a three phase winding with first second and third terminals, said commutator comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes each resting against one of said first second and third commutator rings, said first and second sets of commutator brushes being on diametrically opposite sides of the commutators, first second and third brushes of said first set of of commutating brushes connected electrically to anodes of first second and third diodes respectively of said first set of diodes, first second and third brushes of said second set of commutating brushes connected electrically to cathodes of first second and third diodes respectively of said second set of diodes, the cathodes of all diodes of said first set of diodes connected electrically together, the anodes of all diodes of said second set of diodes connected electrically together, the common cathode junction of said first set of three diodes connected to first terminal of said field winding, the second terminal of said field winding connected to the positive terminal of a dc voltage source, the negative terminal of said dc voltage source connected electrically to the common anode junctions of said second sets of three diodes, said slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with conducting segment of one of corresponding said commutator rings, also said first second and third end terminal of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one of said three slip ring brushes, the cathode ends of all said three pairs of first and second diodes connected together by a first conductor, the anode ends of all said three pairs of first and second diodes connected together by a second conductor, said first conductor connected to the positive terminal of said dc voltage source, said second conductor connected to the negative terminal of said dc voltage source, cathode and anode of said field diode connected across first and second terminals respectively of said field winding.

4. A direct current series two motor system comprising, field windings with first and second terminals, field diode, rotating armature, armature windings, commutators and associated stationary brushes, slip rings and associated stationary brushes, a full wave bridge rectifier, first second and third controlled rectifier and associated trigger and bias circuit, first second and third diode, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes each resting against one of said first second and third commutator rings, said first and second sets of commutator brushes being on diametrically opposite sides of the commutators, first second and third brushes of said first set of commutating brushes connected electrically to anodes of said first second and third controlled rectifier, first second and third brushes of said second set of commutating brushes connected electrically to cathodes of said first second and third diode respectively, the cathodes of all said first second and third controlled rectifiers connected electrically together, the anodes of all said first second and third diodes connected electrically together, the common cathode junction of said three controlled rectifiers connected to first terminal of said field winding, the second terminal of said field winding connected to the positive terminal of a dc voltage source, the negative terminal of said dc voltage source connected to the common anode junction of said three diodes, said slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with conducting segment of one of corresponding said commutator rings, also said first second and third end terminal of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one of said three slip ring brushes, the cathode ends of all said three pairs of first and second diodes connected together by a first conductor, the anode ends of all said three pairs of first and second diodes connected together by a second conductor, said first conductor connected to the positive terminal of said dc voltage source, said second conductor connected to the negative terminal of said dc voltage source, cathode and anode of said field diode connected across first and second terminal of said field winding, said trigger circuit providing three gating signals to said first second and third controlled rectifier thus providing means for smoothly controlling armature power, said bias circuit comprising of first second and third resistances connected to the cathode of first second and third controlled rectifier respectively, the other ends of all said three resistances connected to the positive terminal of a bias source, the negative terminal of said bias source connected to the positive terminal of said dc voltage source.

5. A permanent magnet field, two pole direct current motor system comprising, permanent magnets to provide the field flux, rotating armature, armature winding, commutators and associated stationary brushes, slip rings and associated stationary brushes, a full wave bridge rectifier, first and second set of diodes, each set comprising of first second and third diodes, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments leading one and lagging the other, each said first and second set of commutator brush comprising first second and third brushes each resting against one said first second and third commutator rings, said first and second sets of commutator brushes being on diametrically opposite sides of the commutators, first second and third brushes of said first set of commutating brushes connected electrically to anodes of first second and third diodes respectively of said first set of diodes, the cathodes of all diodes of said first set of diodes connected electrically to the positive terminal of a dc voltage source, first second and third brushes of said second set of commutator brushes connected electrically to cathodes of first second and third diodes respectively of said second set of diodes, the anodes of all diodes of second set of diodes connected electrically to the negative terminal of said dc voltage source, said slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with conducting segment of one of corresponding said commutator rings, also said first second and third end terminals of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one said three slip ring brushes, the cathode ends of all said three pairs of first and second diodes connected together by a first conductor, the anode ends of all said three pairs of first and second diodes connected together by a second conductor, said first conductor connected to the positive terminal of said dc voltage source, said second conductor connected to the negative terminal of said dc voltage source.

6. A permanent magnet field, two pole direct current motor system comprising, permanent magnets to provide the field flux, rotating armature, aramture winding, commutators and associated stationary brushes, slip rings and associated stationary brushes, a full wave bridge rectifier, first second and third controlled rectifier and associated trigger and bias circuits, first second and third diodes, said armature windings comprising a three phase winding with first second and third terminals, said commutators comprising first second and third commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments leading one and lagging the other, each said first and second set of commutator brush comprising first second and third brushes each resting against one said first second and third commutator rings, said first and second sets of commutator brushes being on diametrically opposite sides of the commutators, first second and third brushes of said first set of commutating brushes connected electrically to anode of said first second and third controlled rectifiers, the cathodes of all said three controlled rectifiers connected electrically to the positive terminal of a dc voltage source, first second and third brushes of said second set of commutator brushes connected electrically to cathode of said first second and third diodes respectively, the anodes of all said three diodes connected electrically to the negative terminal of said dc voltage source, the slip rings comprising of first second and third electrically conductive rings and associated first second and third stationary slip ring brushes resting against the corresponding rings, said first second and third end terminals of said armature winding connected respectively to said first second and third commutator segments such that each said winding terminal is electrically conductive with conducting segment of one of corresponding said commutator rings, also said first second and third end terminals of said armature winding connected respectively to said first second and third slip rings such that each winding terminal is electrically conductive with one of said three slip rings, said full wave bridge rectifier comprising three pairs of first and second diodes, the anode-cathode junction of each pair of said three pairs of first and second diodes being electrically connected to one said three slip ring brushes, the cathode ends of all said three pairs of first and second diodes connected together by a first conductor, the anode ends of all said three pairs of first and second diodes connected together by a second conductor, said first conductor connected to the positive terminal of said dc voltage source, said second conductor connected to the negative terminal of said dc voltage source, said trigger circuit providing gating signals to said first second and third controlled rectifier thus providing means for smoothly controlling armature power, said bias circuit comprising of first second and third resistances connected to the cathodes of first second and third controlled rectifiers respectively, the other end of all said three resistances connected to the positive terminal of a bias source, the negative terminal of said bias source connected to the positive terminal of said dc voltage source.

7. A permanent magnet field, two pole direct current motor system comprising, rotating permanent magnets to provide the field flux, stationary armature winding, commutators and associated stationary brushes, slip rings and associated stationary brushes, a full wave bridge rectifier, first and second set of diodes each set comprising of first second and third diodes, said stationary armature windings comprising a three phase winding with first second and third terminals, said commutators comprising first second and third rotating commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes each said brush resting against a corresponding one of said first second and third commutator rings, said first and second sets of commutator brushes being on diametrically opposite sides of the said commutators, first second and third brushes of said first set of commutating brushes connected electrically to the anode of first second and third diodes respectively of said first set of diodes, the cathode of all three diodes of said first set of diodes connected electrically to the positive terminals of a dc voltage source, first second and third brushes of said second set of commutator brushes connected electrically to cathodes of first second and third diodes respectively of said second set of diodes, the anodes of all three diodes of said second set of diodes connected electrically to the negative terminal of said dc voltage source, said slip rings comprising of first second and third electrically conductive rotating rings and associated first second and third stationary slip ring brushes resting against the corresponding rings, said first second and third conductive rings of said slip rings connected respectively to said first second and third commutator segements such that each said ring is electrically conductive with a conducting segment of one of the corresponding said commutator rings, said first second and third end terminals of said armature winding connected respectively to said first second and third slip ring brushes such that each winding terminal is electrically conductive with one of said three slip ring brushes, said full wave bridge rectifier comprising three pairs of first and second diodes, the anode-cathode junction of each pair of said three pairs of first and second diodes being electrically connected to one of said three slip ring brushes thus making the anode and cathode of said diode pair also electrically conductive with one corresponding three end terminals of said stationary armature winding, the cathode ends of all said three pairs of first and second diodes connected together by a first conductor the anode ends of all said three pairs of first and second diodes connected together by a second conductor, said first conductor connected to the positive terminal of said dc voltage source, said second conductor connected to the negative terminal of said dc voltage source.

8. A permanent magnet field, two pole direct current motor system comprising, rotating permanent magnets to provide the field flux, stationary armature winding, commutators and associated stationary brushes, slip rings and associated stationary brushes, a full wave bridge rectifier, first second and third controlled rectifier and associated trigger and bias circuits, first second and third diodes, said stationary armature windings comprising a three phase winding with first second and third terminals, said commutators comprising first second and third rotating commutator rings and associated first and second sets of stationary commutator brushes, said three commutator rings being mechanically identical each having an electrically conductive segment not exceeding 120° of the commutator ring surface and the rest of the surface being non-conductive, each said conductive segment of said three commutator rings being displaced symmetrically by 120° with respect to the other two segments whereby leading one and lagging the other segment, each said first and second set of commutator brushes comprising a first second and third brushes each said brush resting against a corresponding one of said first second and third commutator rings, said first and second sets of commutator brushes being on diametrically opposite sides of the said commutators, first second and third brushes of said first set of commutating brushes connected electrically to the anodes of said first second and third controlled rectifiers, the cathodes of all said three controlled rectifiers connected electrically to the positive terminals of a dc voltage source, first second and third brushes of said second set of commutator brushes connected electrically to cathodes of said first second and third diodes respectively, the anodes of all said three diodes connected electrically to the negative terminal of said dc voltage source, said slip rings comprising of first second and third electrically conductive rotating rings and associated first second and third stationary slip ring brushes resting against the corresponding rings, said first second and third conductive rings of said slip rings connected respectively to said first second and third commutator segments such that each ring is electrically conductive with a conducting segment of one of the corresponding said commutator rings, said first second and third end terminals of said armature winding connected respectively to said first second and third slip ring brushes such that each winding terminal is electrically conductive with one of said three slip ring brushes, said full wave bridge rectifier comprising three pairs of first and second diodes, the anode-cathode junction of each pair of said three pairs of first and second diodes being electrically connected to one of said three slip ring brushes thus making the anode and cathode of said diode pair also electrically conductive with one corresponding three end terminals of said stationary armature winding, the cathode ends of all said three pairs of first and second diodes connected together by a first conductor, the anode ends of all said three pairs of first and second diodes connected together by a second conductor, said first conductor connected to the positive terminal of said dc voltage source, said second conductor connected to the negative terminal of said dc voltage source, said trigger circuit providing three gating signals for said first second and third controlled rectifier thus providing means for smoothly controlling armature power, said bias circuit comprising of first second and third resistances connected to the cathodes of first second and third controlled rectifiers respectively, the other end of all said three resistances connected to the positive terminal of a bias source, the negative terminal of said bias source connected to the positive terminal of said voltage source.

9. The motor system according to claim 1, where additional means are provided for continuous shifting of all said commutator brushes as a total unit to either sides of nominal design axis in order to optimize motor efficiency and performance.

10. The motor system according to claim 2, where additional means are provided for continuous shifting of all said commutator brushes as a total unit to either sides of nominal design axis in order to optimize motor efficiency and performance.

11. A direct current motor system comprising of multiple pairs of poles for providing the field flux, a three phase winding for providing a rotating magnetic field, commutators and associated commutator brushes, slip rings and associated slip ring brushes, a rectifier for clipping the peak amplitude of induced voltage in motor windings during commutation, blocking diodes for blocking the flow of circulating current between motor winding during commutation, said commutator comprising of a plurality of rotating rings and associated positive and negative group of commutator brushes resting against the rotating commutator rings, each said commutator ring comprising a plurality of conducting segments and the rest of the surface being non-conductive, said slip rings comprising a plurality of conducting rings each in electrical contact with a corresponding slip ring brush, said clipping rectifiers comprising of a plurality of pairs of first and second diodes, the anode of first diode and the cathode of second diode of each said pairs of diodes connected electrically to a corresponding brush of said slip ring brushes, the cathode ends of first diodes of all said pairs of clipping diodes connected electrically to the positive terminal of a dc voltage source, the anode ends of second diodes of all said pairs of clipping diodes connected electrically to the negative terminal of said dc voltage source, each terminal of said three phase winding connected electrically to a corresponding said conducting segment of said commutator and to a corresponding slip ring of said slip rings, said blocking diodes comprising of first and second group of diodes, the anodes of each diode of said first group of blocking diodes connected to a corresponding brush of said positive group of commutator brushes, the cathode of each diode of said second group of blocking diodes connected to a corresponding brush of said negative group of commutator brushes, the cathode ends of all diodes of said first group of blocking diodes connected to the positive terminal of said dc voltage source, the anode ends of all diodes of said second group of blocking diodes connected to the negative terminal of said dc voltage source, the combination of said motor winding, commutators, slip rings, brushes, clipping diodes and blocking diodes, providing a ready path for the flow of reactive energy during commutation and blocking the flow of circulating current during commutation.

12. A direct current motor system comprising of multiple pairs of poles for providing the field flux, a three phase winding for providing a rotating magnetic field, commutators and associated commutator brushes, slip rings and associated slip ring brushes, a rectifier for clipping the peak amplitude of induced voltage in said three phase winding, a group of controlled rectifiers and associated trigger circuit, a group of blocking diodes, said commutators comprising of a plurality of rotating rings in contact with a group of positive and a group of negative commutator brushes, each ring of said commutator comprising of a plurality of electrically conductive segments and the rest of the surface being non-conductive, said slip rings comprising of a plurality of conductive rings each in electrical contact with a corresponding slip ring brush, said clipping rectifier comprising of a plurality of pairs of first and second diodes, the anode of first diode and the cathode of second diode of each said pairs of diodes connected electrically to a corresponding brush of slip ring brushes, the cathode ends of first diodes of all said pairs of clipping diodes connected electrically to the positive terminal of a dc voltage source, the anode ends of second diodes of all said pairs of clipping diodes connected electrically to the negative terminal of said dc voltage source, each terminal of said three phase winding connected electrically to corresponding said conductive segments of said commutator rings and to a corresponding slip ring of said slip rings, the anodes of each controlled rectifier of said group of controlled rectifier connected to a corresponding brush of said positive group of commutator brushes, the cathode of each diode of said group of blocking diodes connected to a corresponding brush of said negative group of commutator brushes, the cathode ends of all controlled rectifiers of said group of controlled rectifiers connected to the positive terminal of said dc voltage source, the anode ends of all diodes of said group of clipping diodes connected to the negative terminal of said dc voltage source, said trigger circuit providing signals for gating the controlled rectifiers, the combination of said motor windings, commutators, slip rings, brushes, blocking diodes, clipping diodes, controlled rectifiers and associated trigger circuit providing a ready path for the flow of reactive energy during commutation, blocking the flow of circulating current during commutation and providing means for smoothly controlling the motor torque.

13. The motor system according to claim 11, operating as a generator instead of a motor.

14. The motor system according to claim 12, operating as a generator instead of a motor.

15. The motor system according to claim 12, where said group of blocking diodes is substituted by a second group of controlled rectifiers and associated trigger circuit.

* * * * *